July 19, 1960     F. W. MARSCHALL     2,945,963

SIGNAL SELECTIVE CIRCUIT

Filed May 20, 1959     2 Sheets-Sheet 1

INVENTOR.
F. W. MARSCHALL
BY
ATTORNEY
AGENT

INVENTOR.
F. W. MARSCHALL
BY
ATTORNEY
AGENT

2,945,963
SIGNAL SELECTIVE CIRCUIT

Frederick William Marschall, Turin Road M.R., Rome, N.Y.

Filed May 20, 1959, Ser. No. 814,653

2 Claims. (Cl. 307—88)

(Granted under Title 35, U.S. Code (1952), sec. 266)

The invention described herein may be manufactured and used by or for the United States Government for governmental purposes without payment to me of any royalty thereon.

This invention relates to signal selective circuits and particularly to a circuit capable of selecting signals lying within predetermined amplitude and width ranges and rejecting all others.

Figure 1:
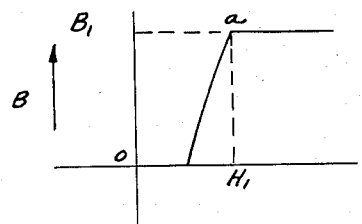
Figure 3:
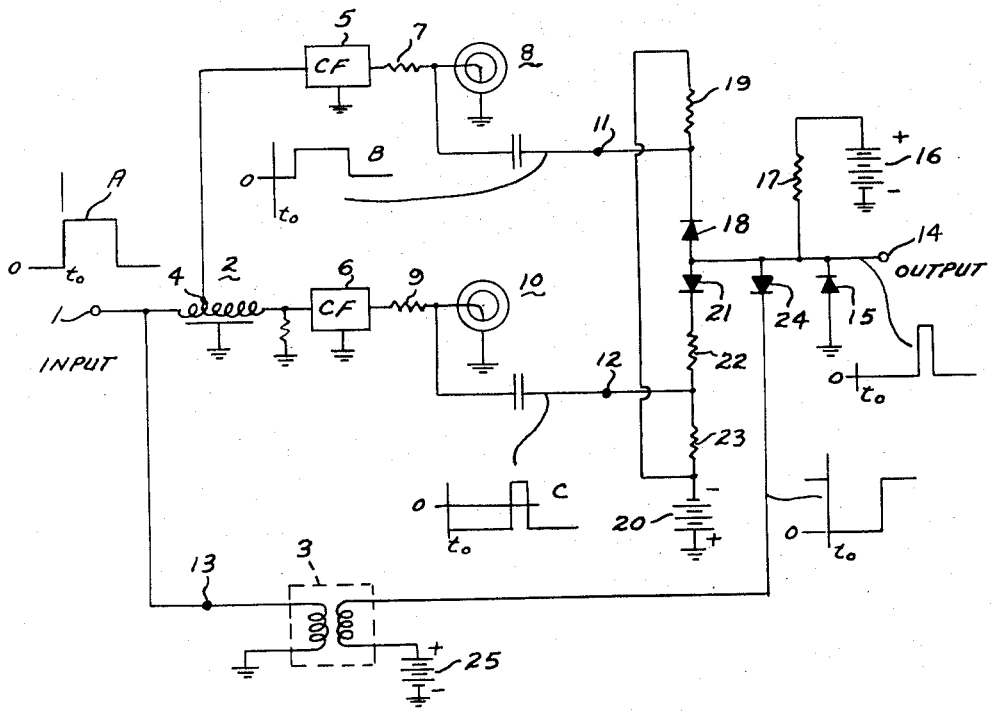

The invention will be described in detail with reference to the accompanying drawings in which Fig. 1 is characteristic of a saturable core reactor as used in the invention, Figs. 2a–2e are diagrams illustrating this operating principle of the invention, and Fig. 3 is the schematic diagram of an amplitude-width selective circuit in accordance with the invention.

Consider a saturable reactor having a characteristic as shown in Fig. 1. Assume the quiescent state to be at point $o$ and an excitation sufficient to produce $H_1$ is applied. Under these conditions the state of the reactor will change from point $o$ to point "$a$" and the reactor will undergo a flux change equal to $SB_1$, where S is the cross sectional area of the core. The rate at which the flux will change will depend upon the type of excitation and the number of turns, or, expressed mathematically, $$(1) \qquad \frac{d\phi}{dt} = \frac{e}{N}$$

where $\phi$ is flux, $t$ is time, $e$ is the exciting voltage and N is the number of turns.

The time required to accomplish a flux change $\phi$ is given by $$(2) \qquad T = \frac{N\phi}{e}$$

For a given saturable core reactor the volt-seconds appearing across the winding is constant since, from (1), $$(3) \qquad edt = Nd\phi$$

The equivalent resistance of a toroidal saturable reactor is given by the expression $$(4) \qquad R_e = 4\pi 10^{-9} \frac{N^2 S}{l} \frac{dB/dt}{h}$$

when $l$ is the mean circumference in centimeters, $h$ is the magnetizing intensity in oersteds and B is the flux density in maxwells/square centimeter. If a saturable reactor is connected in series with a resistor, or to a source having a significant internal resistance, a voltage applied to the resistor-reactor combination will divide between the resistor and the reactor in proportion to their impedances. Further, since the volt-second output of a reactor is constant, the duration of the voltage across the reactor will be a function of the magnitude of the applied voltage. Thus when a reactor is energized under the above conditions by a pulse of large magnitude the duration of the voltage pulse across the reactor will be shorter than for an energizing pulse of small magnitude. The characteristics of the pulse appearing across the reactor is dependent upon the relationships given in Equations 1, 2 and 3. The invention utilizes the constant volt-second property of a saturable core reactor as will be seen later.

Figure 2:
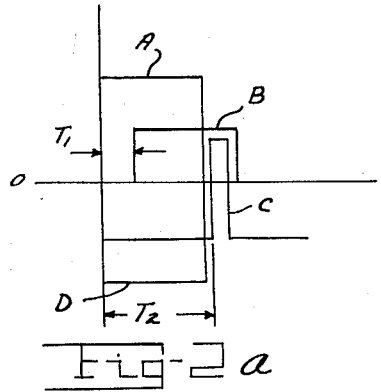
Figure 2:
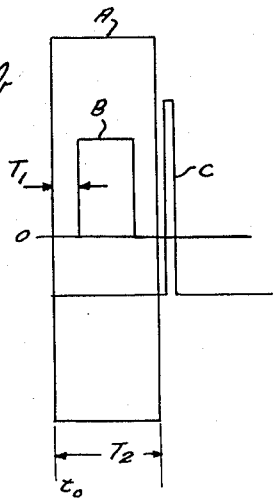
Figure 2:
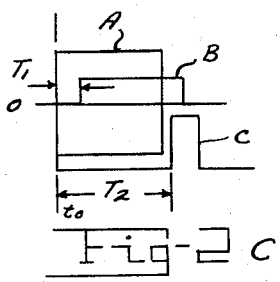
Figure 2:
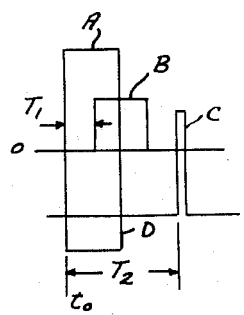
Figure 2:
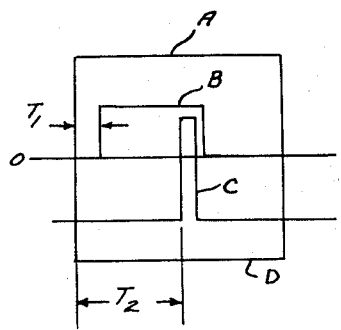

Figs. 2a–2e illustrate the basic principle of the invention. Assume A to be an input pulse applied to a signal selective circuit having two saturable core reactors. Assume also that the input pulse is delayed by an interval $T_1$ and applied to one of the reactors and that this reactor is designed so that the resulting pulse across its winding is as represented by B. Assume further that the pulse A is delayed by an interval $T_2$ and applied to the other reactor, that this reactor is designed so that the resulting pulse across its winding is as represented by C, that the reference potential for pulse C is made negative relative to the reference potential for pulses A and B, and that pulse D is obtained by inverting pulse A. Finally, assume that an output is produced by the circuit only when the following conditions, existing in Fig. 2a, are met: (1) C extends above the zero reference, and (2) there is time coincidence between pulses B and C but not D.

As stated above, the necessary conditions are met in Fig. 2a so that the circuit will produce an output in response to a pulse A of the amplitude and width or duration illustrated. The effects of changes in magnitude and width of pulse A are illustrated in Figs. 2b–2e.

Fig. 2b shows the magnitude of pulse A increased above that illustrated in Fig. 2a. This causes a corresponding increase in the magnitude of pulse B. However, since the volt-second output of the reactor must remain constant as stated before a compensating decrease in the width or duration of the pulse must occur. Hence B in Fig. 2b is shorter than in Fig. 2a. The increased magnitude of pulse A has a similar effect in increasing the magnitude and decreasing the width of pulse C. In this case the shortened duration of pulse B prevents time coincidence between pulses B and C so that no output occurs.

Fig. 2c illustrates the effect of a decrease in the magnitude of pulse A. The significant result in this case is the decrease in the magnitude of pulse C. If the magnitude of pulse A is reduced sufficiently pulse C does not rise above the zero reference and no output occurs.

Fig. 2d illustrates the effect of a decrease in the width of pulse A. The significant effect here is the reduction in width of pulse B which prevents time coincidence between B and C and hence prevents an output.

Finally, Fig. 2e illustrates the effect of an increase in the width of pulse A. Here the significant effect is the corresponding increase in the width of pulse D resulting in time coincidence between pulses B, C and D. Since coincidence of all three pulses does not satisfy condition (2), defined above, an output is not produced.

Thus it is seen that the circuit will not produce an output unless the input pulse A falls within both a predetermined amplitude range and a predetermined width range. Fig. 3 is a schematic diagram of a signal selective circuit operating on the above described principle. In this circuit input pulse A is applied to input terminal 1 and thence to delay line 2 and the primary of pulse transformer 3. The pulse at delay line tap 4, having been delayed by the interval $T_1$, is applied to cathode follower stage 5 and the pulse at the end of the line, having been delayed by the interval $T_2$, is applied to cathode follower stage 6.

The output of cathode follower 5 is applied across a series circuit consisting of resistance 7 and saturable core reactor 8, and, similarly, the output of cathode follower 6 is applied across a series circuit consisting of resistance 9 and saturable core reactor 10. Each of the resistances 7 and 9 is intended to represent both the internal resistance of its associated cathode follower and any external resistance that it may be necessary to add depending upon the electrical characteristics of the particular reactor used. The reactors illustrated are of the type used in digital storage devices and consist of a small doughnut shaped core with a conductor passing through the hole and constituting the winding. When the pulse output of the cathode follower is first applied to the series circuit the voltage divides between the reactor and the series resistance in proportion to the resistance of the resistor and the effective resistance, expressed in Equation 4, of the reactor. When the core saturates no further flux change occurs so that $dB/dt$ in Equation 4 becomes zero and the effective resistance of the reactor falls to the resistance of the winding alone which is very low. The series resistance, 7 or 9, should be sufficiently high relative to the winding resistance that the voltage across the reactor falls substantially to zero when the core saturates.

The remainder of the circuit is an inhibited AND gate having input terminals 11, 12 and 13 and output terminal 14 which is also the output terminal of the selective circuit. An AND gate, as well known in the computer art, is a circuit requiring simultaneous energization of all its input circuits to produce an output. An inhibited AND gate has one or more inhibiting inputs and requires simultaneous energization of all inputs except the inhibiting inputs to produce an output. Energization of an inhibiting input prevents the production of an output under any circumstances. In the inhibited AND gate of Figs. 3, 11 and 12 are regular input terminals and 13 is the inhibiting input terminal. The reference potential for output voltages appearing at output terminal 14 is established at ground potential by means of clamping diode 15.

Prior to the application of any input signal to the AND gate the state of the circuit is as follows: Current flows from the positive terminal of source 16 through resistor 17 and then divides with part flowing through gating diode 18 and resistor 19 to the negative terminal of source 20 and the remainder flowing through gating diode 21 and resistors 22 and 23 to the negative terminal of this source. The total current then flows through source 20 to ground completing the circuit. The parameters of the circuit are so selected that the current flow in resistor 17 due to either diode 18 or diode 21 is sufficient to lower the potential of terminal 14 at least to ground potential. This terminal is prevented from falling below ground potential by clamping diode 15. With terminal 14 at ground potential there is no current flow in gating diode 24 since its cathode is above ground potential by the voltage of source 25. Also with terminal 14 at ground potential, input terminal 12 is negative relative to ground to provide the required negative reference voltage for pulse C.

Considering the operation of the AND gate with inhibiting input 13 unenergized, a positive pulse at input terminal 11 raises the cathode potential of diode 18 cutting off the current flow in this diode. However, the potential of terminal 14 cannot rise due to the current flow in diode 21, as already explained. Therefore energization of input terminal 11 alone will not produce an output. Similarly, energization of input terminal 12 alone will not produce an output at terminal 14. Simultaneous energization of both terminals 11 and 12, however, will cut off the current flow in both diodes and allow the potential of terminal 14 to rise because of its connection through resistor 17 to source 16. Diode 24 does not prevent this rise in voltage because of the positive potential on its cathode due to source 25 which prevents conduction in this diode until terminal 14 has risen to the diode cathode potential. Therefore, simultaneous energization of terminals 11 and 12, but not 13, produces an output from the AND gate.

Engerization of inhibiting input terminal 13 prevents an output from the AND gate under any circumstances.

The positive pulse A applied to terminal 13 is inverted by any suitable inverter 3, such as a vacuum tube stage or the pulse transformer shown. The output of the inverter should at least equal the voltage of source 25. During energization of terminal 13, therefore, the cathode potential of diode 24 is lowered at least to ground potential which prevents its anode and terminal 14 from rising above ground potential and an output from being generated.

I claim:

1. An amplitude-width discriminator for serially applied input pulses comprising: first and second saturable core reactors; means for delaying said input pulses by a predetermined interval $T_1$; means having an internal impedance high relative to the winding resistance of said first reactor for applying said $T_1$ delayed pulses to said first reactor for producing a voltage pulse thereacross; means for delaying said input pulses by a predetermined interval $T_2$ greater than $T_1$; means having an internal impedance high relative to the winding resistance of said second reactor for applying said $T_2$ delayed pulses to said second reactor for producing a voltage pulse thereacross; means for inverting said input pulses; and means responsive to the voltages across said reactors and to said inverted input pulses for producing an output signal when at any instant not concurrent with said inverted input pulses the voltages across said reactors both exceed a predetermined reference potential.

2. An amplitude-width discriminator for serially applied input pulses comprising; first and second saturable core reactors; means for delaying said input pulses by a predetermined interval $T_1$; means having an internal impedance high relative to the winding resistance of said first reactor for applying said $T_1$ delayed pulses to said first reactor for producing a voltage pulse thereacross; means for delaying said input pulses by a predetermined interval $T_2$ greater than $T_1$; means having an internal impedance high relative to the winding resistance of said second reactor for applying said $T_2$ delayed pulses to said second reactor for producing a voltage pulse thereacross; means for inverting said input pulses; and means responsive to the voltages across said reactors and to said inverted input pulses for producing an output signal when at any instant not concurrent with said inverted input pulses the voltages across said reactors both exceed a predetermined reference potential; said last named means comprising an output terminal; a resistor connected between said output terminal and a point of positive potential relative to said reference potential; a first diode having its anode connected to said output terminal and its cathode connected through a resistor to a point of negative potential relative to said reference potential; means for applying the voltage across said first reactor between the cathode of said first diode and a point at said reference potential; a second diode having its anode connected to said output terminal and its cathode connected through a resistor to said point of negative potential; means for applying the voltage across said second reactor between an intermediate point on the last named resistor and a point at said reference potential; a third diode having its anode connected to said output terminal; means for applying said inverted input pulses between the cathode of said third diode and a point of positive potential relative to said reference potential; and a fourth diode having its anode connected to a point at said reference potential and its cathode connected to said output terminal.

References Cited in the file of this patent

UNITED STATES PATENTS

| | | |
|---|---|---|
| 2,853,634 | Deise | Sept. 23, 1958 |
| 2,866,016 | Weiss | Dec. 23, 1958 |